Figure 1:
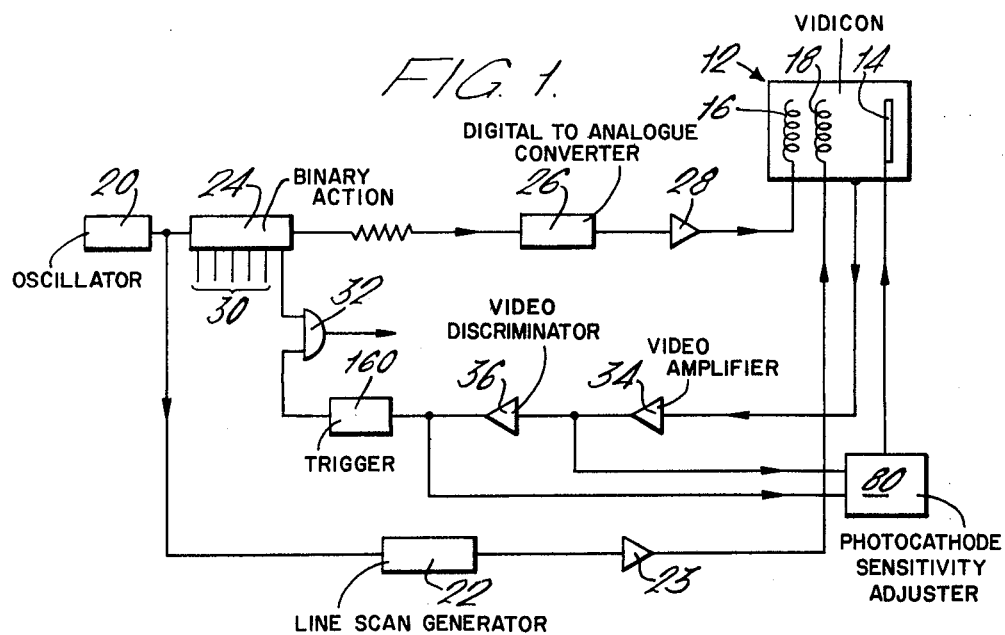

United States Patent [19]
Partridge

[11] 3,836,259
[45] Sept. 17, 1974

[54] APPARATUS FOR TRACKING A LUMINOUS OBJECT

[75] Inventor: Frank Bernard Roy Partridge, Mentone, Victoria, Australia

[73] Assignee: Commonwealth of Australia, C/- the Department of Civil Aviation, Melbourne, Victoria, Australia

[22] Filed: Mar. 29, 1972

[21] Appl. No.: 239,220

[30] Foreign Application Priority Data
Apr. 8, 1971   Australia............................ 4551/71

[52] U.S. Cl. .... 356/152, 178/DIG. 21, 250/203 CT
[51] Int. Cl............................................. G01c 1/00
[58] Field of Search............. 356/152; 178/DIG. 21, 178/DIG. 29; 250/203 CT

[56] References Cited
UNITED STATES PATENTS
| | | | |
|---|---|---|---|
| 3,444,380 | 5/1969 | Webb.............................. | 250/203 R |
| 3,614,240 | 10/1971 | Brandts............................. | 356/152 |
| 3,733,133 | 5/1973 | Chapman............................ | 356/152 |

Primary Examiner—Richard A. Farley
Assistant Examiner—Richard E. Berger
Attorney, Agent, or Firm—Cushman, Darby and Cushman

[57] ABSTRACT

Apparatus for tracking a lamp in the nose of an aircraft calibrating an instrument landing system comprising a vidicon tube, a scanning arrangement for causing scanning the vidicon photocathode along parallel lines and including a frame scan generator controlled by a binary counter so that the instantaneous condition of the counter determines the line being scanned, a sighting device aligned with the vidicon so that a reference line of the scan can be aligned in a predetermined orientation relative to an aircraft landing approach path and discriminator means arranged to select from the vidicon output a pulse representing the lamp image which pulse causes read out of the counter to identify a scan line intersecting said image, displacement of the identified scan line from the reference line representing angular deviation of the lamp from said orientation as viewed by the vidicon.

23 Claims, 9 Drawing Figures

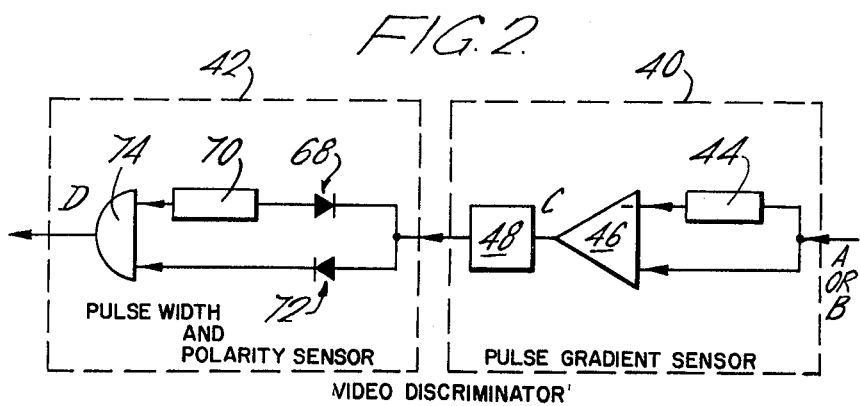
FIG. 2.
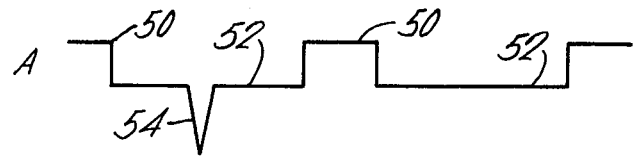
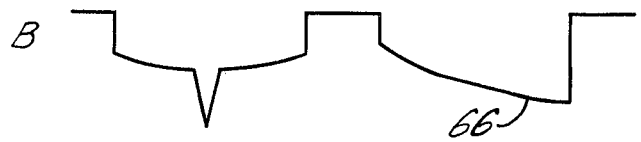
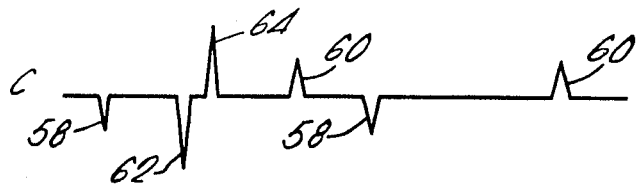
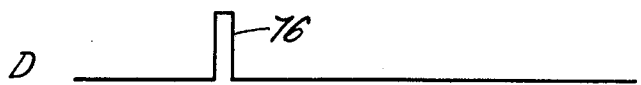

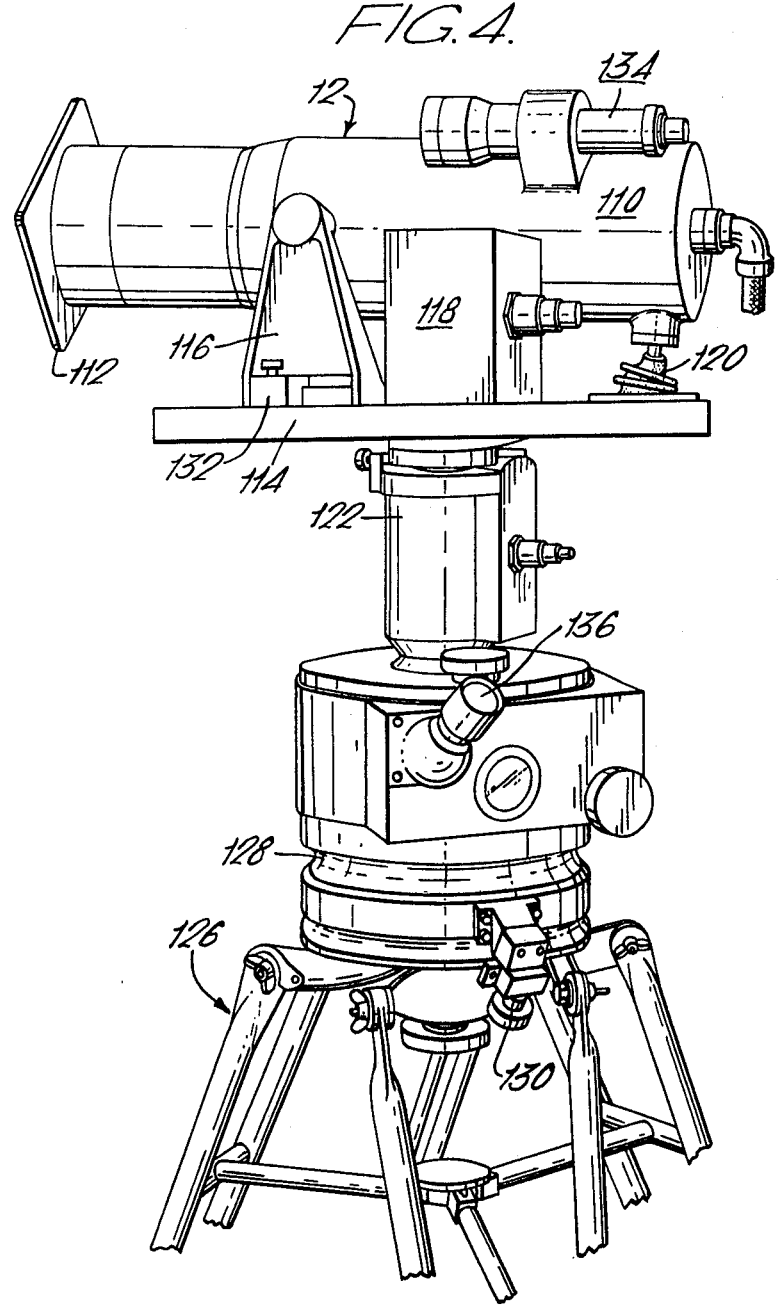

APPARATUS FOR TRACKING A LUMINOUS OBJECT

The present invention relates to apparatus for use in tracking a luminous object. The invention is intended particularly but not exclusively for use in optical equipment for tracking the flight path of an aircraft in azimuth or in elevation during flight calibration procedures.

Civil aviation authorities require equipment for tracking an aircraft during calibration procedures in order to test the accuracy of an instrument landing system. In the past, such equipment has used a theodolite-like device, which has been manually adjusted to follow the aircraft to measure variation of the actual flight path from a predetermined desired path. The known tracking equipment is no longer satisfactory, however, in view of the requirement for greater accuracy at lower levels. The required accuracy is difficult to obtain with radio tracking apparatus, because reflections of radio beams from ground and buildings make the operation of such apparatus unpredictable. It has been proposed therefore that optical tracking equipment should be used, and it is an object of the present invention to provide apparatus which facilitates the use of tracking equipment.

According to the present invention there is provided apparatus for use in tracking a luminous object comprising a photosensitive target, scanning means operable to scan the target to produce an output signal representing illumination thereof, means to select from said output signal a portion representing an image of the object and means for determining displacement of the image in one dimension from a reference on the target whereby the reference can be caused to represent a predetermined orientation and said displacement can be caused to represent angular deviation of the object from said orientation, the apparatus further including means for causing the target to follow movement of the object in directions orthogonal to said dimension.

Means may be provided to enable discrimination between the image of the object and other illumination impinging on the target and to which it may also be sensitive. The operation of the discriminating means may be based on expected differences in intensities of the various sources of illumination and/or the expected sharpness of the outline of the image on the target and/or the expected dimensions of the image.

The invention may therefore provide apparatus for use in tracking a luminous object comprising a photosensitive target, means operable to scan the target to produce an output signal representing illumination thereof, means to sense changes in intensity of illumination of predetermined sharpness and to produce "edge" signals in response thereto, interval defining means to define a predetermined time interval from the production of a first edge signal and output means operative to produce an output if a second edge signal is received within said time interval.

The scanning means may be operable to scan the target along a plurality of parallel lines, one of which can provide said reference, and the means for determining displacement may comprise means operable to identify a line of the scan on which the image is sensed. The means to identify a line may be responsive to the output of a frame scan generator means. The object following means may comprise means to assess that portion of a line which has been scanned when the image is sensed, and means to adjust the position of the target in response to the portion assessed.

Sighting means may be provided to enable an operator to point the target in a desired direction. In this case means may be provided to enable the operator to ensure that a reference in said sighting means bears a known relationship to said reference on the target.

The invention may therefore further provide apparatus for use in tracking a luminous object comprising a photosensitive target, scanning means operable to scan the target to produce an output signal representing illumination thereof, means defining a field of view for the target, a sighting device aligned with the target so that they have a common field of view, a reference mark incorporated in the sighting device so as to be superimposed on the field of view thereof and means operable to adjust the scan so that a predetermined portion thereof can be brought into substantial coincidence with the reference mark in relation to the common field of view.

Means may also be provided to enable adjustment of the output signal of the target in response to the brightness of the image.

The invention may therefore further provide apparatus for use in tracking a luminous object comprising a photosensitive target, scanning means for scanning said target so as to produce an output signal representing illumination thereof, means to select from the signal a portion representing an image of the object, assessor means responsive to sensing of the image to assess the brightness thereof, and adjusting means to cause adjustment of the output signal of the target in accordance with the brightness of the image.

Figure 5:
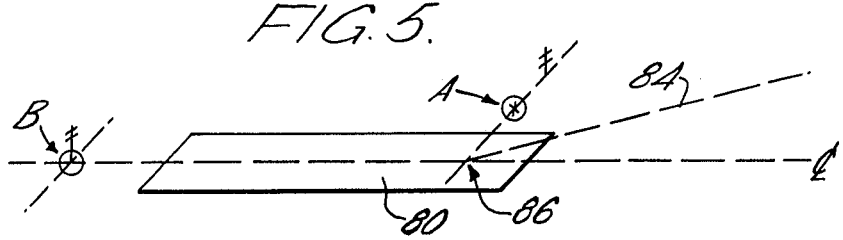
Figure 8:
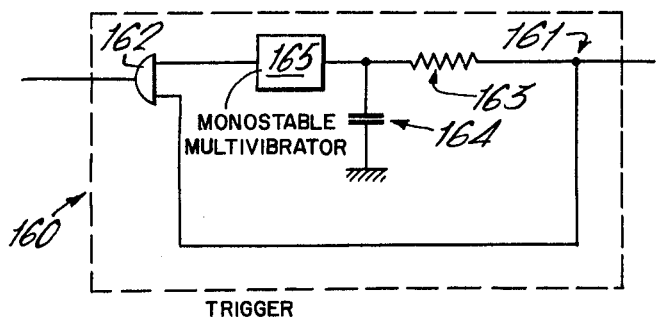
Figure 3:
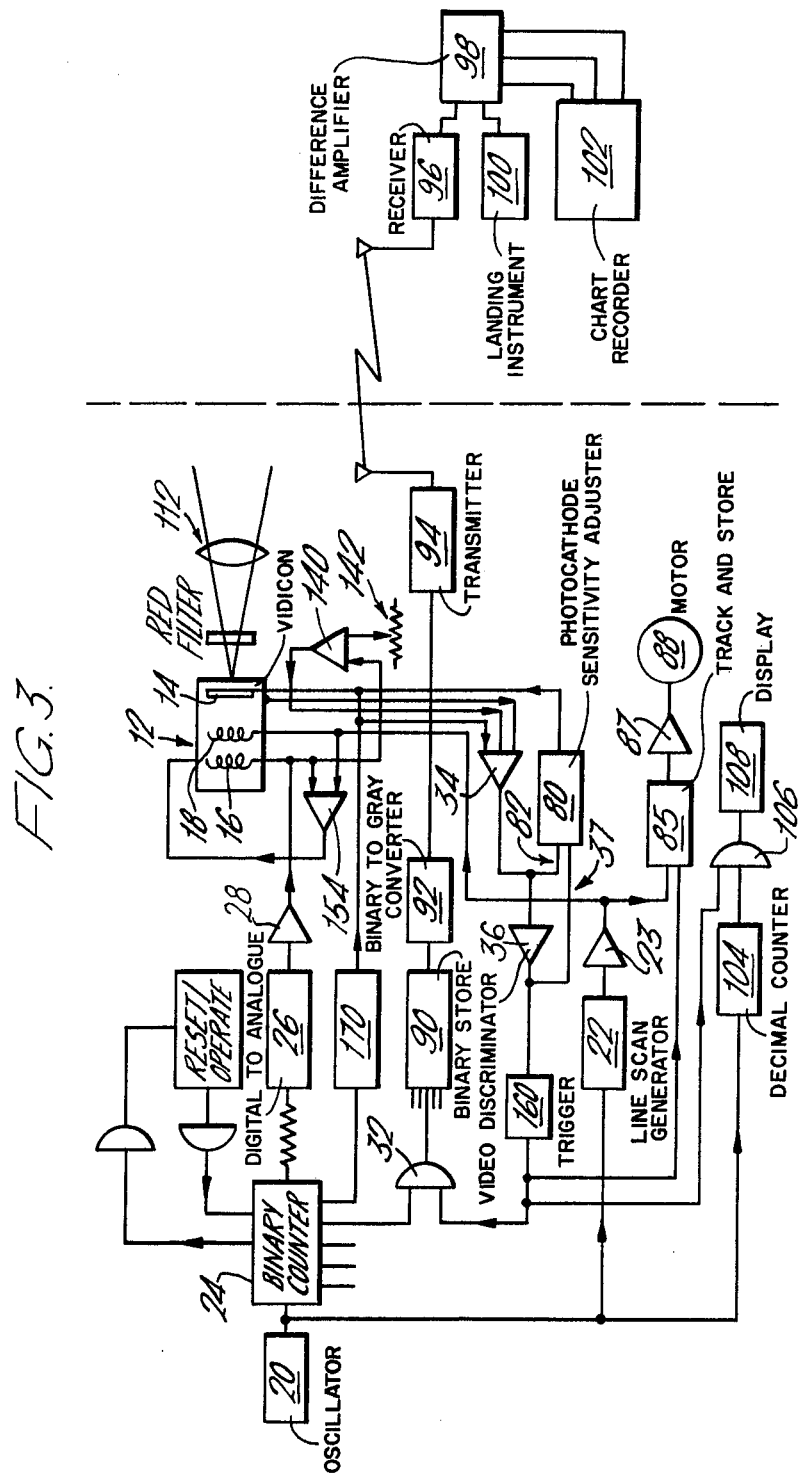
Figure 6:
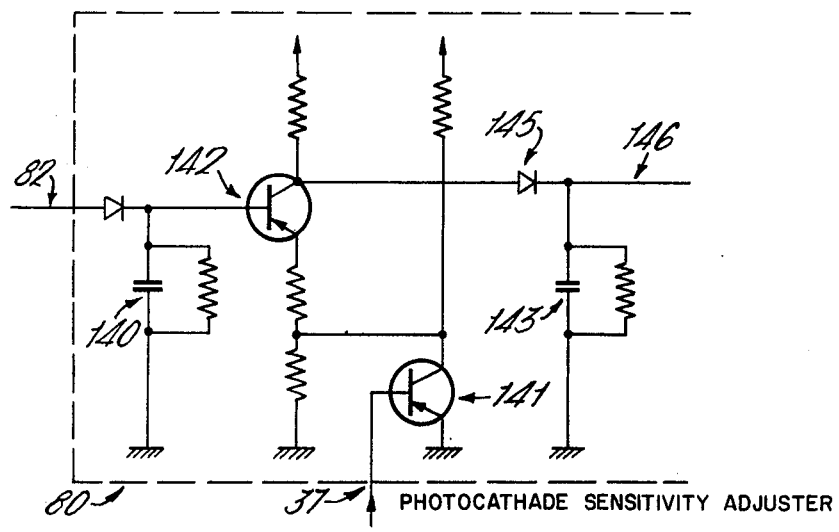
Figure 6A:
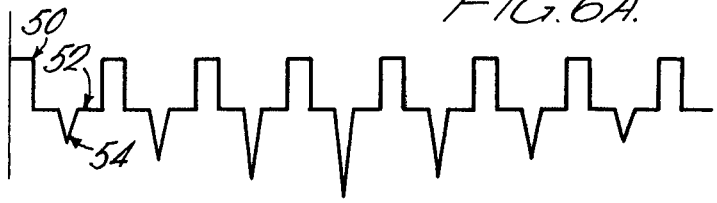
Figure 7:
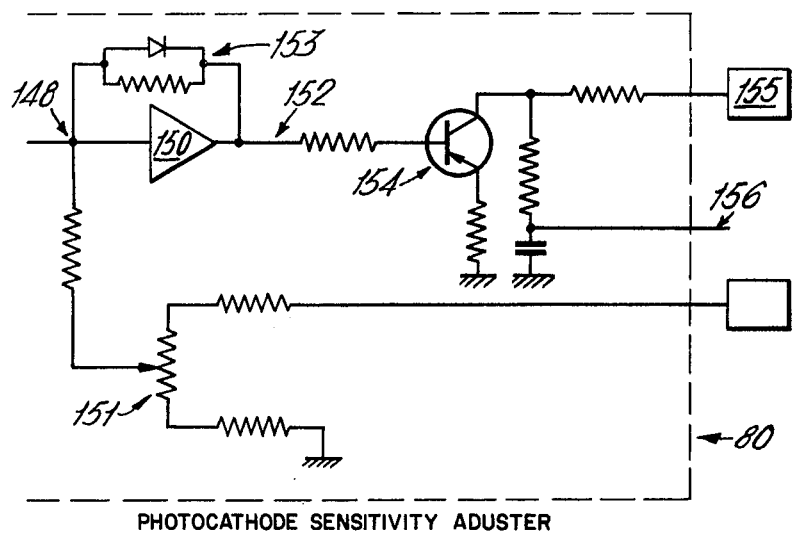

One embodiment of the present invention will now be described with reference to the accompanying drawings, in which:

FIG. 1 is a block diagram of a basic detection system of equipment for tracking movement of an aircraft down a flight path, FIG. 2 is a more detailed diagram of part of the system illustrated in FIG. 1, and also shows diagrammatically waveforms to be expected at various points in the system, FIG. 3 is a block diagram of the complete equipment and illustrates diagrammatically the relationship of the equipment with an aircraft under test, FIG. 4 is a perspective view of part of a prototype of the equipment set up for use, FIG. 5 is a diagram showing positions of the equipment relative to the prearranged approach path suitable for making two types of measurement, FIGS. 6, 7 and 8 are circuit diagrams showing further detail of parts illustrated in block in the preceding figures, and FIG. 6A shows waveforms for use in explanation of FIG. 6.

The tracking operation will first be introduced generally without reference to the drawings and further details of the operation will be described later. The equipment is intended to track the path of movement of a lamp which is mounted in the nose of an aircraft calibrating an instrument landing system. The lamp is mounted on a platform which is servo-controlled by a gyro-system on the aircraft to maintain it pointed in the general direction of the equipment regardless of pitch and yaw of the aircraft in flight. The beam from the lamp is focused by an optical lens system onto a photosensitive target. The target is scanned by an electron beam to determine the position of the spot produced by impingement of the light beam. By suitable referencing of the target, movement of the spot in one dimension relative to the target can be made to represent angular movement of the aircraft in one sense relative to a predetermined flight path. In operation, the equipment is designed to assess the degree of angular movement of the aircraft in one sense (either in azimuth or elevation) relative to the ideal approach path, and the result can be compared with the flight path assessed by the instrument landing receiving equipment on the aircraft.

FIG. 1 illustrates the system which detects the beam to enable assessment of the position of the aircraft. The target is provided by the photocathode 14 of a device 12 which resembles a T.V. camera. The camera is provided with an electron gun (not illustrated) to produce an electron beam. This beam is caused to scan the photocathode by means of two sets of coils, the frame coils indicated at 16 and the line coils indicated at 18. The line coils cause the beam to scan along a straight line on the photocathode, while the frame coils cause the beam to "step" in a direction perpendicular to the line. By suitable energisation of these coils, the beam is caused to scan a plurality of adjacent, parallel lines in a cyclically repetitive sequence. The scanning operation is caused by energisation of an oscillator 20, the output of which is fed to a line scan generator 22 and to a binary counter 24, the purpose of which will be discussed in greater detail below. The line scan generator, clocked by the oscillator, operates in known manner via an amplifier 23 and the line scanning coil 18 to cause scanning of the beam along a line which is selected by the frame scanning coil 16.

The frame scanning system comprises binary counter 24 and a digital to analog converter 26 which functions as a frame scan generator. The output of this generator is fed via an amplifier 28 to the frame scanning coil to determine the particular line to be scanned at any instant. The binary counter is arranged to produce 256 output signals respectively representing the numbers zero to 255 in eight bit binary code. These signals are respectively associated with 256 lines to be scanned in a complete frame, and the frame scan causes scanning of the line represented by the instantaneous output signal supplied by the counter.

The instantaneous output signal of the counter also appears on eight output terminals, some of which are indicated by the reference 30 in FIG. 1. These output terminals pass respective bits at the counter output to respective gates, one of which is indicated at 32. Each gate is also arranged to receive a video signal from the photocathode target 14 transmitted by way of a video amplifier 34 and a video discriminator 36. The latter is effective to select from the output of the photocathode a "spot signal" representing the spot. This is arranged to trigger a device 160 which permits an operating signal to pass to each of the gates 32. Arrival of the operating signal opens the gates so that the digital signal representing the line being scanned when the spot is detected is passed through. A signal passed by the gates can be transferred to any desired further processing equipment, one possible arrangement of which will be described with reference to the complete equipment shown in FIG. 3.

The equipment is only designed to register sensing of the spot on one line of the scan. The spot may however straddle a number of lines of the scan and this number will increase as the aircraft approaches the equipment. Accordingly, device 160, which is triggered by the first sensing of the spot, say on the line at the bottom of the spot, prevents gating of a further binary output during a preset number of line scans.

The video discriminator is shown in greater detail in FIG. 2. It comprises two basic blocks, a pulse gradient sensor indicated at 40 and a pulse width and polarity sensor indicated at 42. The pulse gradient sensor 40 is arranged to receive the output of the video amplifier 34. This is passed to a delay device 44 which delays the signal 1 $\mu$s. and the output of delay device 44 is fed to a difference amplifier 46. The output from amplifier 34 is also supplied direct to the difference amplifier 46, the output of which therefore represents an amplification of the difference between the instantaneous output of amplifier 34 and the output of the amplifier 1 $\mu$s. before. The output of amplifier 46 is fed to a device 48 which passes only those signals which reach a predetermined threshold level. The output from this device is fed to the pulse width and polarity sensor 42.

The operation of the pulse gradient sensor 40 may be better understood by reference to the waveforms indicated at A, B, and C beneath the main diagram. Waveforms A and B represent possible outputs of the video amplifier 34, the waveform A representing an ideal output and waveform B showing possible variation of that output encountered in practice. Waveform C represents the output of amplifier 46 corresponding with waveform A.

For convenience assume first the ideal output A is achieved. The waveform comprises a first portion 50 representing a flyback signal level, and a second portion 52 representing the output signal level during scanning of a line on the photocathode. Typical periods for these portions are 50 $\mu$s. for portion 50 and 100 $\mu$s. for portion 52. On one of the portions 52 a pulse 54 will be produced due to sensing of the spot produced by the light beam. The expected duration of this pulse is of the order of 2 $\mu$s.

The output C from amplifier 46 will now comprise a base level signal 56 with a series of pulses superimposed thereon. Pulses 58 and 60 will represent the changes in signal level between the flyback portions and the scanning portions. Upon receipt of pulse 54, the amplifier will produce an output pulse 62 representing the change in signal A from the level 52. Within 2 $\mu$s. a second pulse 64 will be produced representing the return of signal A to level 52. Pulses 62 and 64 will of course be of opposite polarity, but no particular significance is to be ascribed to the polarities indicated in FIG. 2 since the actual polarities will depend upon the arrangement of the system in practice.

Due to variation in background radiation, the actual waveform will probably be continuously varying during the scan, the instance as indicated in waveform B. It is to be noted however that at least a predetermined minimum difference in intensity is expected between the spot and the background radiation falling on the photocathode and the outline of the spot is expected to be sharp. The signal level supplied to gradient sensor 40 is therefore expected to change by at least a predetermined amount within the period of 1 $\mu$s. determined by the delay device 44 and signal level changes due to background variation are not generally expected to reach this "threshold." The threshold determined by device 48 will be determined accordingly.

Any indistinct zone between a relatively low level of background radiation and a relatively high level will produce a slower rise time in the signal level than is necessary to satisfy the conditions determined by pulse gradient sensor 40, and accordingly there will be no corresponding signal output from the device. For instance, the steady gradient indicated at 66 in waveform B is insufficient to produce an output signal from the pulse gradient sensor.

It is possible however that there will be a distinct change in background signal level sufficient to satisfy the pulse gradient sensor 40. Accordingly, a pulse width and polarity sensor 42 is provided, and operates on the principle that the first "twin" pulse 62 must be of a definite polarity and must also be followed within a maximum of 4 $\mu$s. by a pulse 64 of opposite polarity. The sensor 42 comprises a first rectifier diode 68 arranged to pass pulse 62 to a monostable circuit 70. Pulse 62 triggers the monostable which is arranged to produce an output signal for 4 $\mu$s. after it has been triggered. This output signal is supplied to a gate 74. Sensor 42 also comprises a second rectifier 72 which is arranged to pass pulse 64 to the gate. When both inputs of the gate are energised, a pulse 76 shown in waveform D is passed to device 160 to operate it as described above. To operate gate 74 pulse 62 must be received before pulse 64 otherwise there will be no signal on the gate input from monostable 70. Hence, only a signal satisfying the conditions determined by both sensors 40 and 42 will be permitted to gate the output of binary counter 24.

It is now possible to explain further the mode of operation of the equipment as a whole, reference being made to FIG. 5. The instrument landing system under test will be radiating signals from two guidance antennas. One, the localiser, is located at one end of the runway and by reference to its radiation, the aircraft should be able to determine deviation from the longitudinal centre line of the desired approach extending down the centre line of the runway. The other, the glide path antenna, is located to one side of the runway opposite the location at which the aircraft should touch down. By reference to its radiation, the aircraft should be able to determine height above or below the desired glide path During a test, the aircraft is caused to fly as nearly as possible along a predetermined flight path 84 towards the touch down point on the runway indicated at 86. The equipment can then be used to enable recording of the actual flight path of the aircraft either in elevation or in azimuth. In the latter case, the equipment would be located at the end of the runway remote from the touchdown point, for instance at the point B beside the localiser antenna indicated in FIG. 5. The disposition of the camera 12 would then be adjusted (as will be described hereinafter) so that the lines of the scan are vertical, and the frame coils step the scan horizontally. By a process to be described, the scan line at or near the centre of the photocathode would be selected as reference and the camera position would be chosen so that the reference line is at about the centre of the localiser path as it appears in the field of view of the camera. Accordingly, the identification of the line upon which the spot is first sensed indicates the angular displacement of the aircraft from the centre line of the localiser path as represented by the reference scan line. As will also be described later, the instrument is provided with an automatic adjustment system to pivot the camera to follow the aircraft down the glide path, the reference line remaining of course at the centre of the localiser path.

If it is desired to record the actual flight path in elevation, the instrument is located to one side of the aiming point of the aircraft on the runway, for instance at the point A in FIG. 5. The scan coils are rotated through 90° relative to their previous dispositions, so that the lines of the scan are now horizontal and the frame coils step the scan vertically. Again a reference line is chosen at or near the centre of the photocathode. Assume for simplicity that the glide path line lies in a plane extending up from the ground at the ideal glide path angle. Then the camera will be aligned so that this plane intersects the reference line with the optical axis of the camera extending upwardly along the plane. In practice, careful siting of the equipment will be required to make allowance for aberrations in the glide path. The camera is pivoted in azimuth as the aircraft moves down the glide path.

Turning now to the diagram of the complete equipment in FIG. 3, the parts shown in FIG. 1 are indicated by the same reference numerals. The output signal from the binary counter representing the line upon which the spot is first detected is gated via gates 32 to a binary store 90, and from there it is converted into a binary gray code by a converter 92. This code is transmitted via telemetry equipment 94 to a receiver 96 on the aircraft wherein it is decoded. The decoded signal is fed with information from an output of the instrument landing receiver 100 to a difference amplifier 98 the output of which is fed to chart recorder 102.

Also, in the complete ground equipment a decimal indicator device is included to give a visible indication to the operator of the position of the spot on the cathode. If necessary this can be called over a radio link to the pilot of the aircraft to advise him of the accuracy of his flight path. The decimal indicator comprises a decimal counter 104 energised by oscillator 20. The output of counter 104 is fed to a gate 106 which also has an input from device 160 so that the decimal count when the line is scanned appears on a visual indicating device 108. The decimal system must of course be synchronised with the binary system so that there is a known correspondence between the decimal count and the lines of the frame scan.

The system which adjusts the camera to maintain the lamp within the field of view of the camera employs the output of the line scan generator 22 which is of the usual saw tooth shape employed in normal television scanning. This saw tooth waveform is fed from amplifier 23 to an input to a "track and store" unit 85 where the instaneous value of the saw tooth signal can be "tracked." Any output of device 160 is also supplied to another input to the unit, so that when an operating pulse is fed to the gates 32, unit 85 is switched to the storage mode and the instantaneous level of the saw tooth wave is retained in the store. This of course represents the position of the pulse 54 relative to the ends of the portion 52 in the waveform A. Store 85 is arranged to produce an output which is passed via a servo-amplifier 87 to a servo-motor 88 which, as will be described below, adjusts the mounting of the photocathode so as to maintain the spot approximately at the centre of the line upon which it is being sensed.

The mechanical interrelation of the parts may be appreciated from FIG. 4 and the following description.

Camera 12 is provided within a metal cylinder which is mounted on phosphor bronze bearings in outer cylinder 110 shown on the Figure. Mounted in front of the inner cylinder is a lens unit 112 comprising a 500 m.m. F5 hybrid (reflecting-refracting) system with a red filter. The inner cylinder can be locked in either to two angular positions relative to cylinder 110, these positions corresponding with measurement in elevation and azimuth respectively.

Cylinder 110 is mounted on a table 114 by trunnions 116 and the elevation of the cylinder axis relative to the table can be adjusted by a servomotor 118 which constitutes the motor 88 of the camera adjusting system when measurements are being made in azimuth. A sliding guide 120 locates the rear of cylinder 110 laterally relative to table 114. The table is mounted on a vertical shaft located within housing 122. The shaft is arranged for rotation about its own axis by a second servomotor which is mounted upon a firmly based frame 126. The second servo-motor constitutes the motor 88 while measurements are being made in elevation.

Frame 126 is provided with a levelling bowl 128 and levelling screws 130, and a high accuracy bubble inclinometer 132 is provided on table 114 to enable a check that the axis of rotation of the table is vertical. The table 114 is also arranged to be manually rotated about its vertical axis and the elevation of the cylinder can also be adjusted manually. A theodolite telescope 134 is mounted on the side of cylinder 110 so that the principle axis of the telescope is parallel to that of the lens. As will be described below, the telescope is used as an aiming device to enable an operator to point the camera in a desired direction. The telescope is provided with a ruled graticule superimposed upon the user's field of view.

The first step in the setting up procedure is to ensure that the shaft on which the table 114 rotates is vertical. This is checked by means of the inclinometer 132. The operator must then select one of the lines of the scan as a reference and ensure that this reference line on the field of view of the camera corresponds with a reference line provided by the graticule in the field of view of the telescope. Any scan line could be used as a reference, but it is likely that the centre line of the scan will prove most useful as a reference in practice, and the use of the line as reference will be assumed in the following description.

In the selection procedure, the telescope is pointed to an identifiable distant point in the field of view so that the point coincides with the centre of the telescope graticule. The output of the video amplifier 34 is supplied to an oscilloscope (not shown) driven by the same frame and line scan signals as the camera. A blank line in the picture is produced by means of an "electronic cursor." For this purpose, the output of frame scan generator 26 is fed to a comparator 140 for comparison with a d.c. voltage from a manually adjustable potentiometer 142. The electronic cursor can be rendered operable by means of a switch. The pulse output of comparator 140 is fed to video amplifier 34 and blanks out a line of the scan in the signal fed to the oscilloscope. The actual line blanked is determined by the d.c. voltage fed to the comparator. This d.c. voltage is adjusted so that the blanked cursor line covers the picture presentation of the salient point which lies at the centre of the telescope graticule. The cursor line should be the centre line of the scan, and this can be checked by reading off the decimal indicating device 108 because the blanking signal produced by the amplifier 140 is arranged to pass video discriminator 36 in the same way as a spot signal, and hence to initiate the coded read out. If the cursor line is not the centre line of the scan (or whatever other line has been chosen as the reference) the scan can be shifted by application of a suitable bias to the frame scan generator, until the cursor line coincides with the required reference line of the scan and salient point on the picture.

Having established the required association between the centre of the telescope graticule and the scan reference line, the operator can now align the camera with the desired flight path of the aircraft so that the reference line of the scan has a known relationship with the glide path or localiser. Alignment of the reference line with the localiser will be described by way of example, alignment with the glide path being the same in principle. The telescope is first pointed at a previously surveyed distant point so that the centre of the graticule overlies that point. The point has a known azimuth bearing from the camera site and from the localiser path. The angle of the optical axis of the telescope relative to the mounting of the camera can then be read off a graduated scale at 136. The table can now be rotated through the required angle measured by the azimuth scale, to align the camera with the localiser so that the reference line of the scan coincides with the localiser.

The inner cylinder of the camera is of course locked relative to cylinder 110 so that the scan lines are vertical during this process and the preceding step of aligning the telescope with the scan. To make measurements relative to the glide slope, it is necessary to rotate the inner cylinder to make the scan lines horizontal, and to repeat the steps of aligning the telescope with the scan and with the desired flight path. The surveyed point must this time have a known elevation from the camera and the angle of the axis of cylinder 110 relative to the table can be read from an elevation scale which cannot be seen in the Figure.

A device is provided to adjust the sensitivity of the photocathode according to the intensity of the spot. This prevents saturation of the photocathode by the signal flux, and has a number of other advantages explained below. The adjusting device, indicated at 80, in FIG. 1 is responsive to the level of a signal supplied to it on input 82 to adjust the sensitivity of the photocathode. The output of amplifier 34 is fed to input 82 and is gated to device 80 in response to selection of a video signal by the video discriminator 36. Thus, when the spot is sensed by the video discriminator, the photocathode output is supplied to the device 80 which adjusts the sensitivity of the photo-cathode in accordance with the signal level received while the spot is scanned.

Further details of block 80 are shown in FIGS. 6 and 7. Assume that the spot straddles seven lines of the frame, and assume an ideal output from the cathode - then that output will include seven pulses of varying amplitude as shown in FIG. 6A. Each of these pulses will satisfy the discriminator 36 and hence there will be seven discriminated pulses 76 fed to device 160 and also to the sensitivity adjustor 80 along line 37.

Referring now to FIG. 6, any voltage (of the correct polarity) appearing on input 82 is temporarily stored on capacitor 140 but is allowed to discharge with a time constant of about 20 $\mu$s. i.e., between successive line scans. Each discriminated pulse 76 appearing on line 37 is applied to the base of transistor 141 thereby causing it to saturate. This allows transistor 142 to conduct to an extent determined by the charge on capacitor 140 which represents the amplitude of the cathode output pulse which produced the discrimated pulse. The resultant current charges capacitor 143, where the charge is allowed to decay with a time constant longer than several frame scans. As the line scanning process continues after the first discriminated pulse 76 has been produced, the charge stored in capacitor 143 will build-up in step-wise fashion until a charge is stored to correspond to the cathode output pulse of maximum amplitude 144 in this frame. After this, further charging of capacitor 143 in this frame is prevented because diode 145 will be back biased. Thus output 146 has a voltage upon it representative of the peak intensity of the spot. In the next frame, the process will be repeated so that the voltage on output 146 is continually a representation of an averaged intensity of the spot over the number of frame scans covered by the time constant of capacitor 143.

The voltage on 146 is applied to node 148 in the input to amplifier 150. Assuming, arbitrarily, that the photocathode output pulses are negative, output 146 will be biassed normally positive and its potential will reduce towards zero as the intensity of the spot increases. A negative voltage is also applied to node 148 from a manually settable potentiometer 151 which is initially set so that the sum of the inputs to amplifier 150 is normally positive; this is before "acquisition" of the aircraft. At this stage the output 152 of the amplifier is held at zero potential by the feedback loop 153. Accordingly transistor 154 does not conduct and the full voltage from a manually adjustable supply 155 is applied to the photocathode by way of line 156; the photocathode sensitivity is determined accordingly.

When the aircraft is first acquired, the spot intensity will probably be low, and the reduction in the positive voltage on line 146 will not be sufficient to permit the input to the amplifier to go negative. The relationship between the initial positive bias on line 146, and the negative potential from potentiometer 151 thus determines a threshold so that output pulses of lesser amplitude than the threshold have no effect upon the photocathode sensitivity. As the spot gets brighter, however, node 148 and the input to the amplifier eventually go negative and output 152 goes positive. Transistor 154 then begins to conduct and to drain off current from the supply 155. Hence the voltage appearing on line 156 is steadily reduced as the spot gets brighter, and the sensitivity of the photocathode is reduced accordingly. The gain of the system is so arranged that the amplitude of the peak output pulse from the photocathode is maintained substantially constant as the brightness of the spot varies. It will be understood that when measuring at long range, there may be only a single output pulse in each frame.

The variation of the sensitivity of the photocathode as described above provides a number of advantages. One problem at least partially overcome by sensitivity adjustment is that of lag in the photocathode. This could be a problem when measuring in the glide path at short range where the angular velocity of the aircraft relative to the photocathode is substantial in the plane of measurement. The lag of the photocathode varies inversely with the voltage applied to it, and hence is reduced as the aircraft approaches the equipment and sensitivity is reduced.

Two further problems overcome by this adjustment of sensitivity are (a) defocussing of the spot because of fixity of the lens relative to the photocathode, and (b) where to set thresholds so that the scan line on which a pulse first passes the discriminator in each frame always represents the same part of the lamp. To understand the way in which these problems are solved it is necessary to refer again to the pulse discriminator. It will be recalled that the output from amplifier 46 represents the difference between the photocathode output signal at one instant and the signal 1 $\mu$s. before. Where there is a very short rise time, as in the case of the spot, this difference depends upon the absolute level of the peak of the cathode output pulse. Now, if the amplitude of the cathode output pulse representing the point of maximum intensity of the lamp is maintained constant, then the amplitude of the cathode output pulse representing the part of the lamp which is to be sensed will also be maintained constant. Since this latter amplitude is constant, the threshold of device 48 can be set accordingly and the first output pulse to be "passed" by the discriminator will always be the one having the required amplitude and will always represent the same point on the lamp.

If the pulse amplitude were not set in this way, (a) the threshold representing any one part of the lamp would have to increase as the lamp approached the equipment, and (b) errors would be introduced because gradual defocussing of the spot as the aircraft approached would "spread" the energy of the beam over the photocathode so that the threshold requirements would be satisfied on a line of the scan earlier than that representing the correct path of the lamp. The alternative of adjusting the lens to maintain focus would involve great difficulty. In the present system, the lens may be adjusted to focus the beam onto the photocathode at maximum designed range of the equipment and no adjustment is required during actual tracking.

A further advantage of sensitivity adjustment lies in a reduction of output due to background illumination as the aircraft approaches the equipment. This is particularly useful when calibrating the localiser at low angles of elevation. In these circumstances, reflections may be received from ground based objects which might cause spurious "sensing" of the spot. However, at this stage of the tracking procedure, sensitivity of the photocathode will be approaching the minimum, and the chance of such reflections satisfying the threshold requirements is minimised.

FIG. 8 shows further details of the device 160 which ensures that only the first pulse 76 in each frame operates gates 32, to allow a digital signal representative of the line upon which the spot was scanned to be placed in binary store 90. The first pulse 76 produced during each frame is applied to the node 161 from where it is applied to one input of gate 162. It is allowed to pass to the output of gate 162 and thence to gates 32 because the other input to gate 162 is at this time held at an appropriate potential by the output from monostable multi-vibrator 165. However, the output state of multivibrator 165 is changed by the application of the first pulse 76 from node 161 through a "short delay" circuit comprising resistor 163 and capacitor 164. The output of multivibrator 165 then applies a blocking signal to the input of gate 162 for about 3 ms. This effectively prevents any pulses 76 which may be derived on the next 20 line scans from being applied to the gates 32. The delay circuit comprising resistor 163 and capacitor 164 is provided to prevent a "race" condition from occurring at gate 162, and thus ensures that the first pulse 76 produced during each frame is allowed to pass to the gates 32.

The voltage developed as target voltage for the automatic target control can also be used to indicate, to the test flight aircraft, the level of signal illumination received at the ground tracking site. For this purpose, the target voltage is digitized, and the digital output used to telemeter signal illumination level to the aircraft. The operator in the aircraft is thus enabled to adjust pitch and yaw of the target lamp for maximum input to the tracking equipment.

A scan failure system indicated diagrammatically at 154 may be incorporated. A conventional blanking waveform generator 170 may also be provided for suppressing video output from the vidicon during the periods of fly-back of the scanning beam. The field of view of the lens photocathode combination may be of the order of 1° in the smaller dimension. The response of the camera tube preferably extends into the near infrared region and possesses uniform sensitivity. The photocathode may be in a vidicon or similar tube. Vidicons employing silicon photocathodes may be especially suitable if their tendency to produce "white spots," which would cause "sensing" of spurious images, can be eliminated. The frame and line scan coils may be specifically designed to give linearity and perpendicularity.

The prototype equipment has been used in tests to track a 1kW tungsten filament lamp situated on the nose of the calibration aircraft. The lamp was 7 inches in diameter and had a beam width of approximately ±4° to ½ power points. Illumination at the centre of the beam was approximately 600 candela, and the colour temperature was 3,500°K.

Tracking was effected from a range of 20 nautical miles against a sky or cloud background of 4,000 ft. lamberts, with a normal visibility range of 30 miles. During calibration, the aircraft was flown along given azimuth and elevation angles, with maximum deviations in the plane of measurement of less than ±0.5°, and angular velocities between 0° and 0.2° per second.

In tests of this type, it was found that when measuring elevation angles at position A, (FIG. 4) the azimuth angle of the aircraft changed by approximately 20° during the approach of the aircraft towards the touch down point. Maximum angular velocity in azimuth was approximately 6° per second with a maximum acceleration of 6° per second/per second. The elevation angle changed by approximately 4° when measuring azimuth angles at position B. Maximum angular velocity for the elevation servo was approximately 0.25° per second with a maximum acceleration of 0.1° per second/per second.

In the event of failure of either the airborne target lamp or the ground electronics, it is desirable that the equipment should possess a tracking capability of a telemetering theodolite. For this reason it is preferable that digitisers should be fitted to horizontal and elevation sections of the moving platform. A 1:1 gearing ratio between hand wheels and digitisers could be provided with 1° of platform movement corresponding to 360° of hand wheel rotation. Graduation on the handwheels should indicate angular increments of the moving platform in 0.01° steps. 1° of platform movement may be coded in 8 bit Gray code in the same manner, and with the same voltage levels, as for the automatic tracking mode.

The lamp described above which is servo-driven to keep the beam pointed in the direction of the camera is not essential. For example, two lamps may be mounted near the front of the test aircraft and arranged to have their beams splayed so that the camera receives a detectable intensity irrespective of the yaw of the aircraft when it is within the required range. The two lamps may be mounted on the nose wheel strut or similar position in the vicinity of the nose. Aircraft not fitted with the special lamp or recording equipment can be tracked by focussing the light from a normal landing lamp on the aircraft onto the target. The output tracking data can be recorded on a chart recorder driven by a digital to analogue convertor connected to the output of binary store 90.

Ideally, the receiving antenna of the aircraft instrument landing system should be aligned with the part of the target lamp which is tracked. This will be difficult to achieve in relation to calibration in the glide path, but if the offset distance is known a simple calculation permits corrections to be made during analysis of results, or the tracking equipment can be so located as to reduce the error to zero. This latter is enabled because the equipment is designed to measure angular deviation from the desired glide path, which for simplicity has been assumed as a plane which will interest the receiving antenna on the aircraft when the latter is in the glide path. A parallel plane will therefore intersect the lamp, and if the equipment is arranged so that the parallel plane, instead of the glide path plane, intersects the reference line on the photocathode, then angular deviation of the lamp from the parallel plane will be equivalent to angular deviation of the antenna from the glide path plane.

The invention is not limited to details of the embodiment illustrated in the drawings. It is not essential to vary the sensitivity of the photocathode to obtain some of the advantages attributed to such adjustment in the abovedescribed equipment. In fact, with some types of tube, such adjustment may not be possible. An alternative would be to vary the amount of light permitted to fall on the photocathode, for example by providing a variable stop or a pair of adjustable cross polarised filters in the optical system, adjustment of the optical system being made in accordance with the intensity of the spot. It would also be possible to adjust the output of ampliifer 34 by an automatic gain control device, but this latter solution to the problem of threshold setting would leave the problem of photocathode saturation unsolved. This latter problem might of course be solved by other means.

It is not essential to read out in response to the first pulse received by the discriminator - this is merely a convenient way of ensuring that the scan line read out represents the same part of the lamp in each frame, the periphery of the lamp in this case. An alternative system would be to read out on each line on which the lamp image produces a pulse to pass the discriminator, and feed the resultant binary numbers to an arithmetical averaging device which will give an output representing the position of the centre of the lamp image relative to the photocathode.

The above description referred to a type of scan in which each line begins at the same side of the photocathode. This involved use of a flyback period which was extended rather longer than normal to allow for transients to die away before commencement of a scan line. An alternative system could involve scanning back and forth across the photocathode, with a relatively short period between each line of the scan. This would enable greater scanning frequency, but would clearly involve modification of other parts of the equipment, for example the sensitivity adjustment arrangement. These and many other modifications and variations may be made without departing from the scope of the invention.

I claim:

1. Apparatus for use in tracking a luminous object comprising a photosensitive target, scanning means operable to scan the target to produce an output signal representing illumination thereof, means defining a field of view for the target, a sighting device aligned with the target so that they have a common field of view, a reference mark incorporated in the sighting device so as to be superimposed on the field of view thereof and means operable to adjust the scan so that a predetermined portion thereof can be brought into substantial coincidence with the reference mark in relation to the common field of view.

2. Apparatus as claimed in claim 1 wherein the scanning means is operable to scan the target along a plurality of parallel lines, the reference mark is a line and the portion of the scan is one line thereof.

3. Apparatus as claimed in claim 2 wherein the reference line is one of a pair of orthogonal lines and the target is rotatable so that the selected line of the scan can be brought into coincidence with either of the reference lines.

4. Apparatus as claimed in claim 2 including means to read out the selected line of the scan.

5. Apparatus as claimed in claim 2 wherein the scanning means includes a vidicon tube incorporating said photosensitive target, an electron gun and line and frame scanning coils, the scanning means further including an oscillator, binary counter coupled to the oscillator and operable to count oscillations thereof, digital-to-analogue converter means coupled between the binary counter and the frame scanning coil, and a line scan generator coupled to the line scanning coil, the apparatus further including storage means, means to select from said output signal a portion representing an image of the object, and gating means having inputs coupled to the binary counter and said means to select and outputs coupled to the storage means and operable to pass the content of the binary counter to the storage means on receipt of said portion representing the image of the object.

6. Apparatus as claimed in claim 5 including display means and decimal counter means operable to count oscillations of the oscillator, the output of the decimal counter means being gated with the output from said means to select and applied to the display means to display the number of the line scanned when the image of the object is scanned.

7. Apparatus as claimed in claim 5 including an oscilloscope driven by said line and frame scanning coils and receiving the output signal from the scanning means representing illumination of the target, blanking means to blank a line in the line scan of the oscilloscope and adjusting means operable on the blanking means to blank out that line which is coincident with said reference mark.

8. Apparatus as claimed in claim 5 including track and store means coupled to said line scan generator and to said means to select whereby the signal output of said track and store means is representative of the location of the image of the object in a direction parallel to said reference line relative to the sweep of the line scans on the target, the apparatus further including a servomotor which is sensitive to said signal output of said track and store unit and which is operable to rotate the target about an axis which is perpendicular to said reference line whereby the object is maintained in said field of view.

9. Apparatus as claimed in claim 5 including blocking means to block said means to select for a predetermined period following receipt of said portion representing an image of the object.

10. Apparatus as claimed in claim 5 including an arithmetical averaging device having input coupled to said means to select and to said binary counter and operable to take the arithmetic means of the content of the binary counter each time a said portion representing the image of the object is detected over a frame of the scan, said arithmetic mean being passed to the storage means after each frame of the scan.

11. Apparatus as claimed in claim 1 including means to adjust the target through a desired angle after the reference mark has been aligned with a presurveyed location and measure orientation therefrom.

12. Apparatus for use in tracking a luminous object comprising a photosensitive target, scanning means for scanning said target so as to produce an output signal representing illumination thereof, means to select from the signal a portion representing an image of the object, assessor means responsive to sensing of the image to asses the brightness thereof, and adjusting means operable to cause adjustment of the output signal from the target in accordance with the brightness of the image.

13. Apparatus as claimed in claim 12 wherein the assessor means comprises means responsive to the peak value of the output signal, in use the last said means being exposed to the output signal for a time after sensing of the image.

14. Apparatus as claimed in claim 12 wherein the adjusting means is operable to cause adjustment of the output signal from the target so that the peak amplitude of said portion of the signal after adjustment is maintained substantially constant as the image is scanned repeatedly.

15. Apparatus as claimed in claim 14 wherein the means to select the portion from the signal comprises threshold means to which the signal is fed.

16. Apparatus as claimed in claim 14 and including optical focussing means in substantially fixed relationship with said target.

17. Apparatus as claimed in claim 14 wherein the scanning means includes a vidicon tube incorporating said photosensitive target, an electron gun and line and frame scanning coils, the scanning means further including an oscillator, binary counter coupled to the oscillator and operable to count oscillations thereof, digital-to-analogue convertor means coupled between the binary counter and the frame scanning coil, and a line scan generator coupled to the line scanning coil, the apparatus further including storage means, and gating means having inputs coupled to said binary counter and to said means to select and outputs coupled to the storage means and operable to pass the content of the binary counter to the storage means on receipt of said portion representing the image of the object.

18. Apparatus as claimed in claim 17 including track and store means coupled to said line scan generator and to said means to select whereby the signal output of said track and store means is representative of the location of the image of the object in a direction parallel to said reference line relative to the sweep of the line scans on the target, the apparatus further including a servomotor which is sensitive to said signal output of said track and store unit and which is operable to rotate the target about an axis which is perpendicular to said reference line whereby the object is maintained in said field of view.

19. Apparatus for use in tracking a luminous object comprising a photosensitive target, means operable to scan the target to produce an output signal representing illumination thereof, and discriminator means comprising means to assess said output signal and operable to produce output signals representative of the gradient thereof, threshold means coupled to the output of said means to assess and operable to pass to its output only those output signals exceeding a predetermined magnitude in either polarity, holding means operable to hold signals applied thereto at its output for a predetermined period, discriminator gating means operable to produce at its output a gated output signal when signals occur simultaneously at its inputs, first polarity sensitive means connected to the output of the threshold means and operable to pass signals of a first polarity to said holding means, and second polarity sensitive means connected to the output of the threshold means and operable to pass signals of opposite polarity to said first polarity to an input of said discriminator gating means, the output of said holding means being connected to another input of said discriminator gating means, whereby the output signal representing illumination of the target to be responsible for the production of a discriminated output signal must produce at the output of the threshold means a pair of pulses, the first of which is of said first polarity and the second of which is of opposite polarity and occurs within said predetermined period.

20. Apparatus as claimed in claim 19 wherein the scanning means includes a vidicon tube incorporating said photosensitive target, an electron gun and line and frame scanning coils, the scanning means further including an oscillator, binary counter coupled to the oscillator and operable to count oscillations thereof, digital-to-analogue converter means coupled between the binary counter and the frame scanning coil, and a line scan generator coupled to the line scanning coil, the apparatus further including storage means, and gating means having inputs coupled to the binary counter and to the output of said discriminator gating means and outputs coupled to the storage means and operable to pass the content of the binary counter to the storage means on receipt of a gated output signal from the discriminator gating means.

21. Apparatus as claimed in claim 20 including display means and decimal counter means operable to count oscillations of the oscillator, the output of the decimal counter means being gated with the output from said discriminator gating means and being operable display the content of the decimal counter means in the display means when a gated output signal occurs at the output of said discriminator gating means.

22. Apparatus as claimed in claim 21 including track and store means coupled to said line scan generator and to the output of said discriminator gating means whereby the signal output of said track and store means is representative of the location of the image of the object in a direction parallel to said reference line relative to the sweep of the line scans on the target, the apparatus further including a servo-motor which is sensitive to said signal output of said track and store unit and which is operable to rotate the target about an axis which is perpendicular to said reference line whereby the object is maintained in said field of view.

23. Apparatus as claimed in claim 20 including brightness assessor means responsive to sensing of the image to assess the brightness thereof, and adjusting means coupled to the brightness assessor means and operable to adjust the sensitivity of the photosensitive target to maintain the peak output therefrom constant.

* * * * *